United States Patent [19]

Schnaibel et al.

[11] Patent Number: 5,020,363

[45] Date of Patent: Jun. 4, 1991

[54] METHOD FOR DETERMINING ATMOSPHERIC AIR PRESSURE IN PRESSURE-CONTROLLED FUEL INJECTION SYSTEMS

[75] Inventors: Eberhard Schnaibel, Hemmingen; Erich Junginger, Stuttgart; Klaus Hirschmann, Leonberg, all of Fed. Rep. of Germany

[73] Assignee: Robert Bosch GmbH, Stuttgart, Fed. Rep. of Germany

[21] Appl. No.: 449,891

[22] PCT Filed: May 5, 1988

[86] PCT No.: PCT/EP88/00377

§ 371 Date: Dec. 6, 1989

§ 102(e) Date: Dec. 6, 1989

[87] PCT Pub. No.: WO89/11033

PCT Pub. Date: Nov. 16, 1989

[51] Int. Cl.[5] .......................................... G01M 15/00

[52] U.S. Cl. .................................. 73/119 A; 123/465

[58] Field of Search .................. 73/119 A, 117.3, 115; 123/465; 364/431.05

[56] References Cited

U.S. PATENT DOCUMENTS

| | | | |
|---|---|---|---|
| 4,590,563 | 5/1986 | Matsumura et al. | 364/431.05 |
| 4,600,993 | 7/1986 | Pauwels et al. | 364/431.05 |
| 4,926,335 | 5/1990 | Flowers et al. | 364/431.05 |

*Primary Examiner*—Jerry W. Myracle

*Attorney, Agent, or Firm*—Michael J. Striker

[57] ABSTRACT

A method of determining the prevailing atmospheric air pressure in a pressure-controlled injection system wherein the intake manifold pressure (Ps), measured when a predetermined load condition of the engine has been detected, is multiplied by a predetermined, preferably speed-dependent factor (K) to provide a value representative of the atmospheric air pressure (Po).

10 Claims, 3 Drawing Sheets

METHOD FOR DETERMINING ATMOSPHERIC AIR PRESSURE IN PRESSURE-CONTROLLED FUEL INJECTION SYSTEMS

BACKGROUND OF THE INVENTION

The present invention relates to a method for determining atmospheric air pressure in pressure-controlled fuel injection systems.

In vehicle engines having pressure-controlled fuel injection systems, i.e. systems in which the basic measured variable of the system is the intake manifold pressure, the exhaust back-pressure, which is dependent upon the prevailing atmospheric air pressure, influence the residual quantity of gas remaining in the engine cylinders during the exhaust cycle and hence the volume of fresh gas that can enter the cylinder on the next induction stroke. This has the result that, as the atmospheric air pressure decreases, the mixture in the cylinders of the engine becomes leaner. For example, when the engine is idling, the mixture becomes leaner, typically by approximately 4.5% per 1,000 m. altitude. In order for this error to be corrected, it is necessary to provide some means of determining the prevailing atmospheric air pressure.

A measure of the prevailing atmospheric air pressure can be obtained using the pressure value measured by the conventional intake manifold pressure sensor when the engine speed is still zero or extremely low, e.g. cranking speed. However, since the atmospheric pressure changes with the altitude at which the vehicle is operating, a measure of atmospheric pressure made initially by measuring the intake manifold pressure at start up of the engine requires correction to take account of a changing altitude of operation of the vehicle.

SUMMARY OF THE INVENTION

It is an object of the present invention to provide a method for obtaining a value for the atmospheric air pressure, based on the measured intake manifold pressure but measured during running, non-idling conditions.

In accordance with the present invention, there is provided a method of determining the prevailing atmospheric air pressure in a pressure-controlled injection system, the method comprising detecting when the engine is operating at or above a predetermined load condition, measuring the prevailing intake manifold pressure (Ps) at that condition, and multiplying the measured intake manifold pressure (Ps) by a predetermined numerical factor (K) to provide a pressure value (Po) representative of the atmospheric air pressure.

By arranging for the predetermined load condition to correspond to the pre-established condition that the measured manifold pressure is a predetermined percentage of the actual atmospheric pressure, a value corresponding to the actual atmospheric pressure can be obtained for any given measured intake manifold pressure, if said pre-established condition has been reached.

In order to establish whether said predetermined load condition has been reached and/or exceeded, the ratio of measured throttle valve angle and engine speed can be monitored and compared with stored values.

Preferably, there is pre-established a characteristic engine-specific curve of the respective throttle valve opening angle $\alpha$ necessary to achieve at a plurality of given engine speeds (N) the condition that the measured manifold pressure is a predetermined fixed percentage (Q) of the actual atmospheric pressure, the existence of said predetermined load condition being established when the curve is exceeded during vehicle operation and the then prevailing intake manifold pressure (Ps) being multiplied by said factor $K(=100/Q)$ to produce a pressure value (Po) representative of the prevailing atmospheric air pressure.

In a more sophisticated embodiment, there is pre-established a plurality of characteristic engine-specific curves, each of which corresponds to the respective throttle valve opening angle ($\alpha$) necessary to achieve at a plurality of given engine speeds (N) the condition that the measured manifold pressure is a respective fixed percentage (Q) of the actual atmospheric pressure, each curve being based on a different percentage (Q), and wherein, in operation of the vehicle, the atmospheric pressure is determined by multiplying the measured intake manifold pressure by that factor $K\ (=100/Q)$ which corresponds to the curve located most closely to the operating point determined by the prevailing values of engine speed and throttle valve angle.

If said predetermined percentage lies between 95–99%, so that the factor K lies between 1.053 and 1.010, then the overall amount of time the engine operates in a region where the method can be used to compute the atmospheric pressure with acceptable accuracy is reasonably high.

BRIEF DESCRIPTION OF THE DRAWING

The invention is described further hereinafter, by way of example only, with reference to the accompanying drawings, in which.

DETAILED DESCRIPTION OF THE INVENTION

As is well known in the art, the atmospheric air pressure can be measured by the intake manifold pressure sensor, which is present conventionally for detecting the prevailing engine load, in the condition when the intake manifold pressure is the same as, or substantially the same as, the atmospheric air pressure. This normally occurs when the ignition has been switched on and the engine speed is still zero, or very low, i.e. cranking speed.

As explained hereinbefore, in order for the fuel injection system to be able to take account of changes in the operating altitude of the vehicle, it is required that an updated measure of the prevailing atmospheric pressure be made available from time to time.

Figure 1:
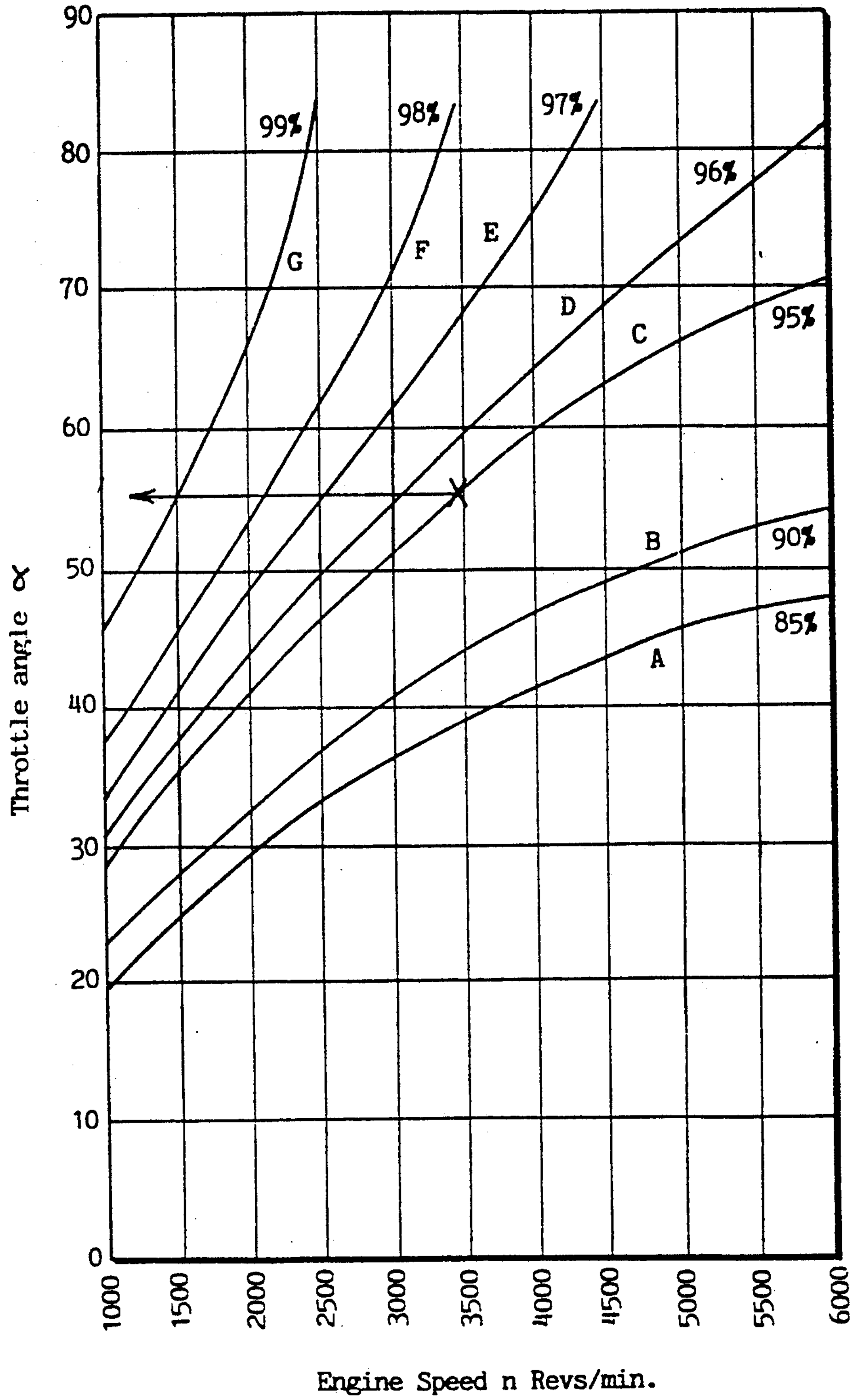
FIGS. 1, 2 and 3 show curves of engine speed (n) against throttle angle $\alpha$ which are used in the explanation of the present method according to our invention.

Referring first to FIG. 1 of the accompanying drawings, there are shown a plurality of characteristic curves, each of which corresponds to measured values of throttle valve opening angle $\alpha$ versus engine rotational speed n. The various curves correspond to the measured values of $\alpha$ and n at which the relationship $$\frac{\text{measured manifold pressure } (Ps)}{\text{measured atmospheric pressure } (Pa)} \cdot 100\%$$

is equal to a respective different substantially full-load value L between 95% and 99%. Thus, at each point on curve A, the values of $\alpha$ and n are such that the ratio $$L = \frac{P_s}{P_o} \cdot 100 = 85\% = \text{Load value}$$

Likewise, at each point on the curves B,C,D,E,F and G, the values of α and n are such that the "load values" given by measured values of $$\frac{Ps}{Po} \cdot 100$$

are 90%, 95%, 96% 97%, 98%, and 99%, respectively.

For the establishment of these curves, throttle valve angle α can be measured in most cases using the conventional throttle valve potentiometer which is usually provided. Engine speed is measured in a conventional manner. Manifold pressure is measured by a conventional manifold pressure sensor. Atmospheric air pressure can be measured by a suitable conventional absolute pressure gauge.

Thus, the load curves of FIG. 1 can be interpreted in the following way. If one considers, for example, the point X in FIG. 1 it will be found that this lies on curve C. This means that at a rotational speed of 3500 revs. per minute and a throttle valve angle of 55°, measurement of the prevailing manifold pressure will provide a load value L which corresponds to 95% of the actual prevailing atmospheric pressure Po. Thus, by multiplying the measured manifold pressure by the factor 1.053 (=100/95) one will gain the true value of the prevailing atmospheric pressure under those conditions.

If, then the throttle valve angle were to be kept constant, while the engine speed reduced, the curves would be crossed of load values L corresponding to 96% -99% of the prevailing atmospheric pressure. Thus, for each of these curves there belongs a respective factor K(L) which can be tabulated as follows:

| Load value $L = P_s/P_o \cdot 100$ (%) | Factor $K = \frac{100}{L}$ |
|---|---|
| 95 | 1.053 |
| 96 | 1.042 |
| 97 | 1.031 |
| 98 | 1.020 |
| 99 | 1.010 |

Thus, in practice, any given combination of rotational speed n and throttle valve angle α will result in a point on one of these curves and the relevant prevailing atmospheric pressure Po can then be obtained simply by multiplying the measured manifold pressure Ps by the relevant factor K corresponding to that curve.

Figure 3:
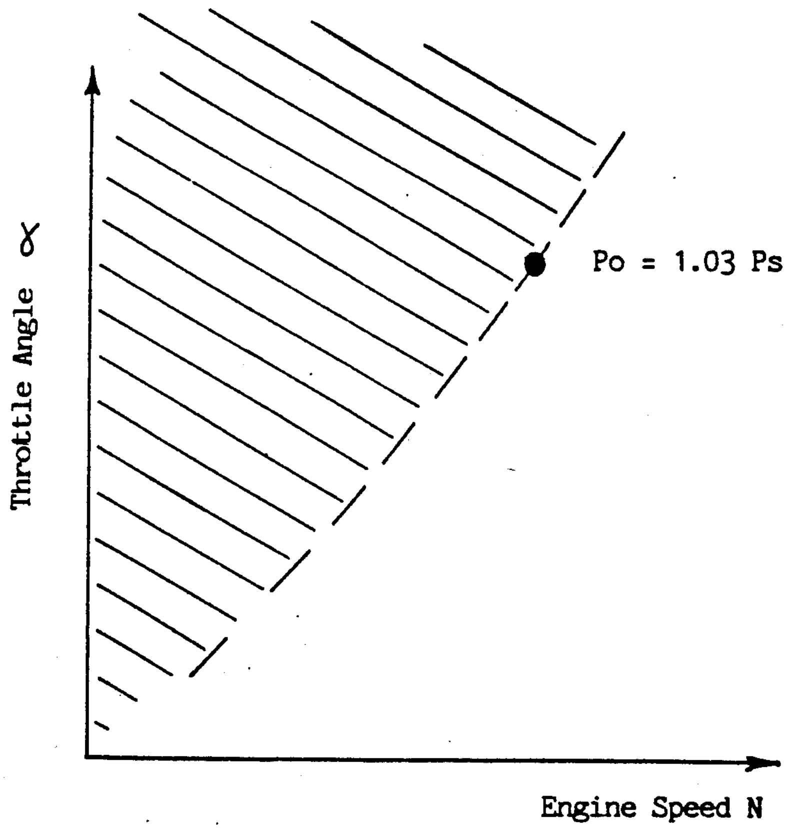

In a first, simplified method using the above-described relationship, just one of the curves of FIG. 1 is selected, as shown in FIG. 3. The selected curve (in this case the line corresponding to a load value of 97% and K=1.03) is stored in a computer memory as a characteristic line within a program and divides the area defined by the curve into two separate regions, i.e. the hatched region above the curve and the unhatched region below the curve. These two regions are used as follows.

Any given rotational speed determines a specific critical throttle angle (α crit) using the characteristic line.

If, at a given engine speed, the actual prevailing throttle valve angle α is smaller than the critical angle α crit at that engine speed, then no computation of atmospheric pressure is made. On the other hand, if the actual throttle angle α is larger than the critical angle at that engine speed, then the measured intake manifold pressure is measured and multiplied by the predetermined single factor K (=1.03) in order to give a reasonable approximation of the prevailing atmospheric pressure.

The selection of the load factor is achieved as follows. If, for instance, one were to select the characteristic curve corresponding to a load value of 97% (K=1.03), the intake pressure could vary from 97% (actual throttle angle equal to the critical angle) to a value near 100% at full load condition. (Full 100% will not actually be achieved in practice due to the differential pressure across the throttle valve when the engine is operating). Thus, in this example, a mean factor of K=1.02, corresponding to a mean load value of 98%, might be a better compromise.

The principles for selecting the appropriate characteristic curve may therefore be based on the following factors: if one selects the characteristic curve corresponding to lower load values, the overall amount of time that the engine operates in the region where the atmospheric pressure can be computed increases, but the accuracy of the computed atmospheric pressure decreases.

In a second, more sophisticated method, the accuracy of the first embodiment is improved by introducing an engine rotational speed dependency. Considering again the point X in FIG. 1, if a straight horizontal line is drawn to the left, this line crosses the curves corresponding to higher load values. This leads to the following approximation.

Figure 2:
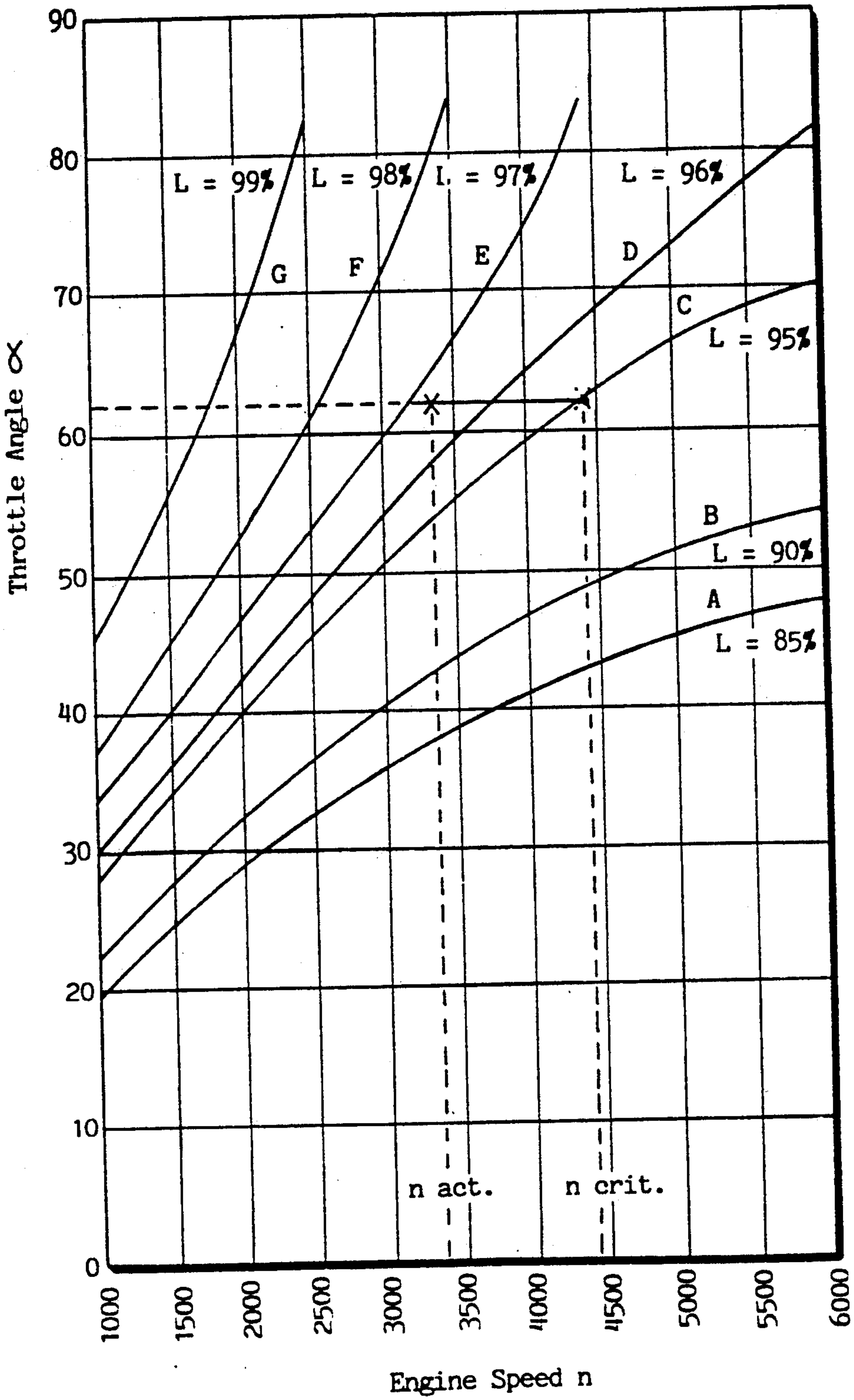

Again one first checks to establish whether the actual throttle angle lies in the region above the selected characteristic curve where the atmospheric pressure may be computed. If this condition is met, one then looks for the rotational speed $n_{crit}$ at which the actual throttle valve angle α becomes equal to the critical angle, i.e. the horizontal line through the point X is continued to the right until it hits the selected curve (e.g. until it hits the curve corresponding to a load value of 95% and K=1.053, as shown in FIG. 2). The ratio between $n_{crit}$ and the actual speed $n_{act}$ is then taken in order to compute the speed dependent factor Ks according to:

$$Ks = K + C \cdot \frac{n_{act}}{n_{crit}}$$

where K is the starting value and corresponds to the load value of the selected characteristic curve, and C is a constant. The measured intake manifold pressure is then multiplied by the modified factor Ks to yield a more accurate value for the atmospheric pressure.

In a further embodiment, the actual measured dependence (α/n) between the rotational speed and the critical throttle valve angle is used. For every load value L, a characteristic curve is stored in a computer memory. For any given operational state of the engine, as determined by the prevailing engine speed and throttle angle, a program then selects which characteristic curve is the nearest one to the operational state of the engine and adopts the corresponding correcting factor K for multiplying the measured manifold pressure to obtain the atmospheric pressure.

As mentioned above, throttle angle can be measured in most cases using the conventional throttle valve potentiometer which is usually provided. However, in engines which do not have a throttle valve potentiometer, a conventional full-load switch can be used to detect the "full-load" condition having been exceeded. When, in this case, the full-load switch becomes closed in operation of the engine, the atmospheric air pressure is determined in that the measured intake manifold pressure (ps) is multiplied by the factor K, corresponding to a selected "full-load" characteristic curve.

In all cases, the calculated atmospheric pressure can then be used until the latter value can be replaced by the result of a new calculation.

While the invention has been illustrated and described as embodied in a method for determining atmospheric air pressure in a pressure-controlled fuel injection system, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims.

1. A method of determining a prevailing atmospheric air pressure in a pressure-controlled injection system of an engine, comprising the steps of detecting when the engine is not operating below a predetermined load condition and measuring a prevailing intake manifold pressure ($P_S$) at that condition and multiplying the measured intake manifold pressure ($P_S$) by a predetermined numerical factor (K) to provide a pressure value ($P_o$) representative to said prevailing atmospheric air pressure, said predetermined load corresponding to a pre-established condition that the measured intake manifold pressure is a predetermined percentage (Q) of the prevailing atmospheric air pressure; and pre-establishing a characteristic engine-specific curve of a respective throttle valve opening angle ($\alpha$) necessary to achieve at a plurality of engine speeds (N) a condition that the measured intake manifold pressure is a predetermined fixed percentage (Q) of the prevailing atmospheric air pressure, the existence of said predetermined load condition being established when the curve is exceeded during engine operation and producing a pressure value ($P_o$) representative of the prevailing atmospheric air pressure by multiplying said factor K (100/Q) by the prevailing intake manifold pressure ($P_s$).

2. A method as claimed in claim 1, further comprising monitoring a ratio of measured throttle valve angle and engine speed and comparing said ratio with stored values of said ratio to establish whether said predetermined load condition has been reached and exceeded.

3. A method as claimed in claim 1, further comprising the steps of pre-establishing a plurality of characteristic engine-specific curves, each of which corresponds to a respective throttle valve opening angle ($\alpha$) necessary to achieve at a plurality of given engine speeds (N) a condition that a measured manifold pressure is a respective fixed percentage (Q) of said atmospheric air pressure, each curve being based on a different percentage (Q), and in operation of the engine determining the atmospheric air pressure by multiplying a measured intake manifold pressure by that factor K (100/Q) which corresponds to the curve located most closely to an operating point determined by said engine speed and throttle angle currently prevailing.

4. A method as claimed in claim 1, wherein said predetermined percentage is between 95 and 99%, so that said factor K lies between 1.053 and 1.010.

5. A method as claimed in claim 1, further comprising detecting said predetermined load condition using a conventional full-load switch which is actuated upon a "full-load" condition being attained.

6. A method of determining a prevailing atmospheric air pressure in a pressure-controlled injection system of an engine, comprising the steps of detecting when the engine is not operating below a predetermined load condition and measuring a prevailing intake manifold pressure ($P_S$) at that condition and multiplying the measured intake manifold pressure ($P_S$) by a predetermined numerical factor (K) to provide a pressure value ($P_o$) representative to said prevailing atmospheric air pressure; pre-establishing a plurality of characteristic engine-specific curves, each of which corresponds to a respective throttle valve opening angle ($\alpha$) necessary to achieve at a plurality of engine speeds (N) a condition that the measured intake manifold pressure is a predetermined fixed percentage (Q) of the prevailing atmospheric air pressure, each curve being based on a different percentage (Q), and in operation of the engine determining the atmospheric air pressure by multiplying a measured intake manifold pressure by that factor K (100/Q) which corresponds to the curve located most closely to an operating point determined by said engine speed and throttle angle currently prevailing; and when said load condition is exceeded at a given engine speed ($n_{act}$), establishing a critical speed ($n_{crit}$) at which a prevailing throttle valve angle crosses said curve and the factor K is modified to provide a modified factor $K_S$, in accordance with the expression $$K_s = K + C \cdot \frac{n_{act}}{n_{crit}},$$

where C is a constant and also comprising using $K_S$ in place of K in the step of determining said atmospheric air pressure.

7. A method as claimed in claim 6, wherein said predetermined load corresponds to a pre-established condition that the measured intake manifold pressure is a predetermined percentage (Q) of the prevailing atmospheric air pressure.

8. A method as claimed in claim 7, further comprising pre-establishing a characteristic engine-specific curve of a respective throttle valve opening angle ($\alpha$) necessary to achieve at a plurality of engine speeds (N) a condition that the measured intake manifold pressure is a predetermined fixed percentage (Q) of the prevailing atmospheric air pressure, the existence of said predetermined load condition being established when the curve is exceeded during engine operation and producing a pressure value ($P_o$) representative of the prevailing atmospheric air pressure by multiplying said factor K (100/Q) by the prevailing intake manifold pressure ($P_S$).

9. A method as claimed in claim 7, wherein said predetermined percentage is between 95 and 99%, so that said factor K lies between 1.053 and 1.010.

10. A method as claimed in claim 6, further comprising detecting said predetermined load condition using a conventional full-load switch which is actuated upon a "full-load" condition being attained.

* * * * *